UNITED STATES PATENT OFFICE.

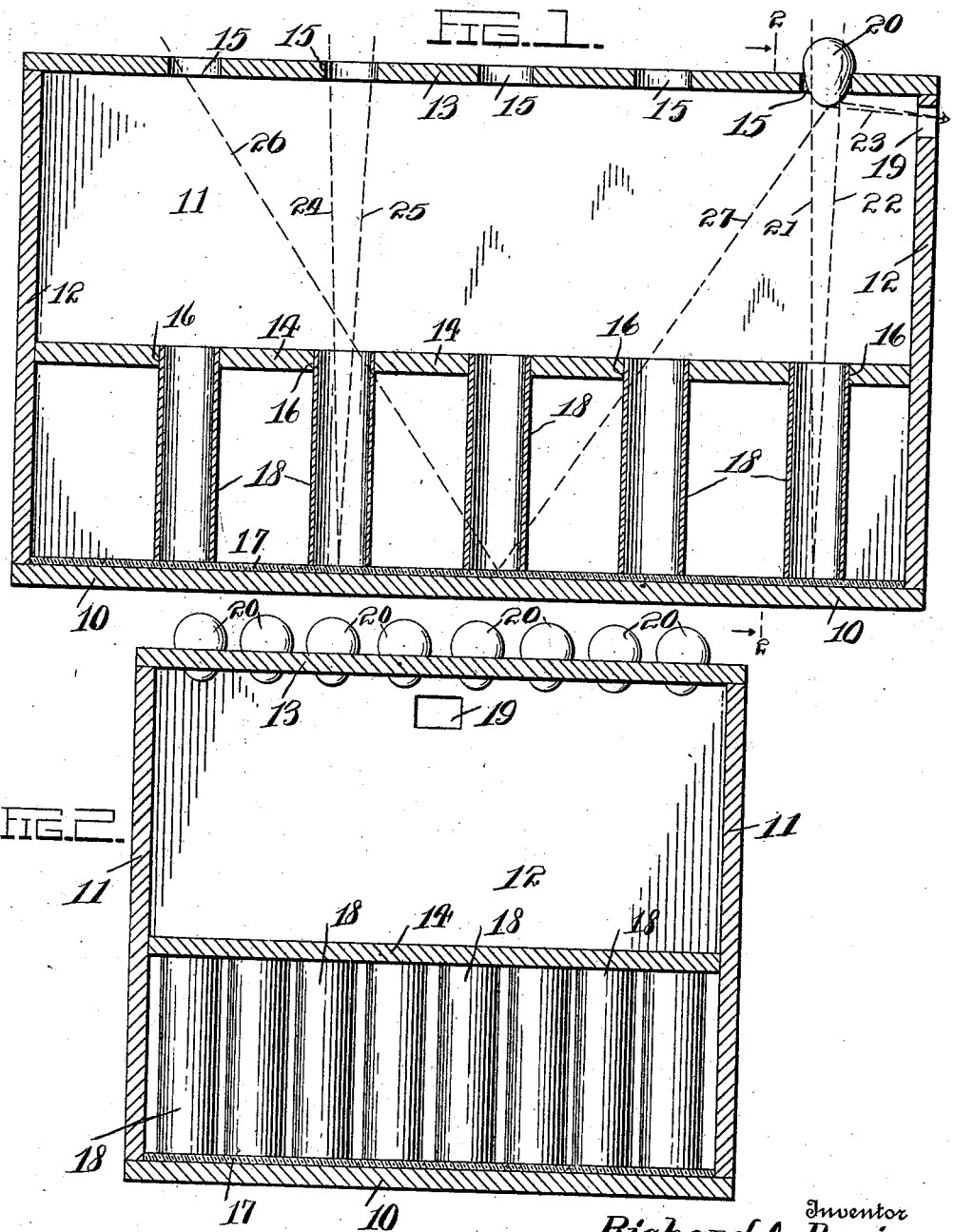

RICHARD A. DAVIS, OF LEXINGTON, MISSISSIPPI.

EGG-TESTER.

996,466.　　Specification of Letters Patent.　Patented June 27, 1911.

Application filed February 20, 1911. Serial No. 609,748.

*To all whom it may concern:*

Be it known that I, RICHARD A. DAVIS, a citizen of the United States, residing at Lexington, in the county of Holmes, State of Mississippi, have invented certain new and useful Improvements in Egg-Testers; and I do hereby declare the following to be a full, clear, and exact description of the invention, such as will enable others skilled in the art to which it appertains to make and use the same.

This invention relates to egg testers and has for an object to provide an egg tester in which the quality of the egg will be determined by means of light passing through the egg itself and being reflected back upon the egg, the intensity of illumination of the egg depending upon the free or obstructed passage of light through the egg itself, so that it will be known to the operater from observing the illuminated exterior of the egg whether or not the egg is good or bad.

A further object of the invention is to provide an egg tester in which a few or a great many eggs may be tested at a single time, and the tester will be so constructed as to positively prevent light being reflected through the unoccupied egg orifices when few eggs are being tested, back on to the eggs being tested, thus the efficiency of the egg tester is promoted by preventing wandering rays of light from interfering with the testing operation when but few eggs are being tested.

With the above objects in view the invention consists in certain novel details of construction and combination of parts hereinafter fully described and claimed, it being understood that various modifications may be made in the minor details of construction within the scope of the appended claims.

In the accompanying drawing forming part of this specification:—Figure 1 is a longitudinal sectional view through the egg tester. Fig. 2 is a cross sectional view taken on the line 2—2 Fig. 1.

Referring now to the drawing in which like characters of reference designate similar parts, the egg tester is shown to comprise an approximately rectangular casing including a bottom 10 from the opposite longitudinal edges of which rise vertical walls 11 and from the opposite end edges of which rise vertical end walls 12, the side and end walls being connected at their top edges by a top wall 13, and further a horizontally disposed partition 14 is arranged within the casing midway between the top and bottom walls.

The top wall is provided with a plurality of egg receiving openings 15, and the partition is likewise provided with a plurality of openings 16 of approximately the same size as the egg receiving openings and in alinement therewith. Arranged upon the bottom of the egg tester is a mirror 17, this mirror contacting with its marginal edges the side and end walls. A plurality of straight tubes 18 are inserted through the openings 16 in the partition, these tubes contacting with their lower ends against the mirror and being supported in upright position thereupon. A sight opening 19 is formed in one end wall of the casing and forms means for viewing the exposed portions of the eggs 20 which project through the egg receiving openings 15 into the interior of the casing.

Referring now to Fig. 1 it will be observed that several rays of light are illustrated by dotted lines, and by virtue of the well known principle that the angle of reflection of a ray of light is equal to the angle of incident of the ray, a ray of light passing through an egg at an angle such as shown by dotted lines at 21, will pass downward through the underlying tube, being reflected by the mirror, and pass to a considerable extent out through the egg again, as shown at 22, but since the egg is by virtue of the intense whiteness of its shell a reflector, part of this ray of light will be reflected as shown at 23 to an observing eye at the sight opening, this reflected ray of light having the effect of illuminating the egg. By virtue of the well known fact that a fresh egg is nearly transparent while a bad egg due to the partial mixture of the yolk with the white is nearly opaque, the light will pass in greater volume through a fresh egg than a bad egg. These differences of volume in the light passing through the eggs will make corresponding differences in the illumination in the eggs. Thus a fresh egg viewed through the sight opening will appear intensely illuminated while a bad egg will be but feebly illuminated and the detection of bad eggs thus made easy.

In order that a few eggs may be tested at one time without the testing operation being impaired by wandering rays of light entering through the unoccupied egg receiving openings, the tubes 18 are positively required. By virtue of these tubes as shown in Fig. 1, a ray of light may enter unoccupied egg receiving openings as shown at 24, and passing through the underlying tube will be reflected by the mirror back through the egg receiving opening as shown at 25 by virtue of the law governing the reflection of light above stated. It is thus clearly demonstrated that all the light reaching the mirror through any particular egg receiving opening will be reflected back through that opening. Now suppose that the tubes were dispensed with, it is clear that the ray of light entering through one of the unoccupied egg receiving openings as shown at 26, could pass through the underlying opening in the partition, arrive at the mirror, and be reflected back therefrom as shown at 27 through an adjacent opening in the partition and eventually arrive at and illuminate an egg being tested.

It is now clear that a simple and efficient egg tester is provided which will be equally effective whether a small number or large number of eggs are being tested at one time.

What is claimed, is:—

1. An egg tester including a casing having an egg receiving opening, and a sight opening, and means within the casing for reflecting light passing through an egg in said opening back upon said egg for illuminating said egg.

2. An egg tester including a casing having a plurality of egg receiving openings, and a sight opening, light reflecting means for reflecting light entering the casing through an egg in one of said openings, back upon and illuminating said egg, and means for preventing light which enters unoccupied egg receiving openings from illuminating eggs being tested.

3. An egg tester including a casing, a partition horizontally disposed within the casing, a mirror on the casing bottom, alined openings being formed in the top of said casing and in said partition, and a plurality of tubes engaged in the partition openings and bearing upon said mirror, said casing top openings being designed to receive eggs and permit of portions of the eggs projecting interiorly within the casing, one wall of said casing being formed with a sight opening for viewing the exposed portions of eggs projecting within the casing.

In testimony whereof, I affix my signature, in presence of two witnesses.

RICHARD A. DAVIS.

Witnesses:
L. E. BARR,
W. H. FINCHER, Jr.

---

Copies of this patent may be obtained for five cents each, by addressing the "Commissioner of Patents, Washington, D. C."